MARTIN SUMMERS & SAMUEL B. LANE.
Improvement in Grain Binders.

No. 119,668.

2 Sheets--Sheet 1.

Patented Oct. 3, 1871.

Witnesses.

Inventors
M. Summers,
S. B. Lane, by
Geo. E. Brown, Attorney.

MARTIN SUMMERS & SAMUEL B. LANE. 2 Sheets--Sheet 2
Improvement in Grain Binders.
No. 119,668. Patented Oct. 3, 1871.

Witnesses.
C. F. Brown.
J. E. Were

Martin Summers, and
Samuel B. Lane,
Inventors, by
Geo. E. Brown, Atty.

UNITED STATES PATENT OFFICE.

MARTIN SUMMERS AND SAMUEL B. LANE, OF ZIONSVILLE, INDIANA.

IMPROVEMENT IN GRAIN-BINDERS.

Specification forming part of Letters Patent No. 119,668, dated October 3, 1871.

*To all whom it may concern:*

Be it known that we, MARTIN SUMMERS and SAMUEL B. LANE, of Zionsville, of the county of Boone and State of Indiana, have invented certain Improvements in Grain-Binder Attachment to Reaping-Machines, of which the following is a specification:

Our invention consists in the construction, arrangement, and operation of certain devices to be attached to reaping-machines for automatically gathering the cut grain into gavels and binding them with straw, as will hereinafter more fully appear.

Figure 3:
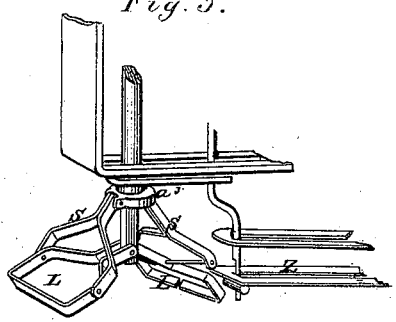
Figure 1:
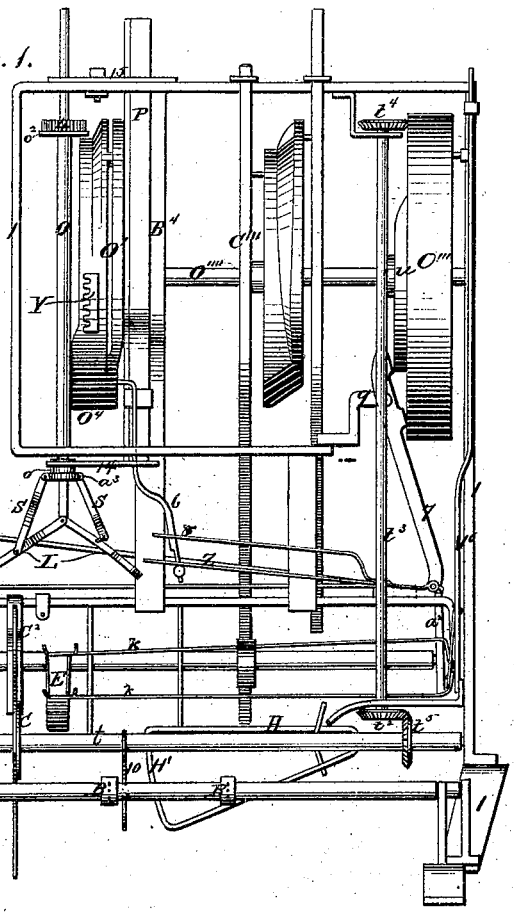
Figure 4:
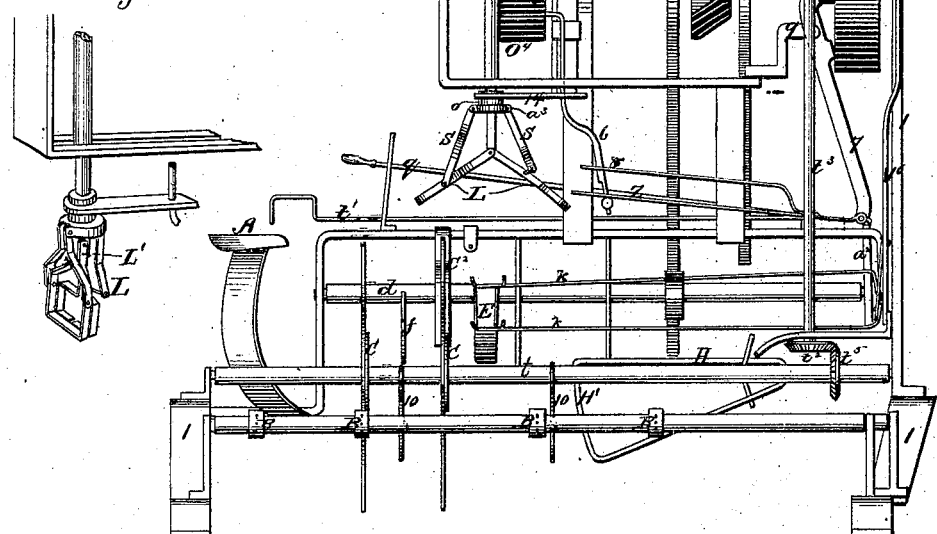
Figure 2:
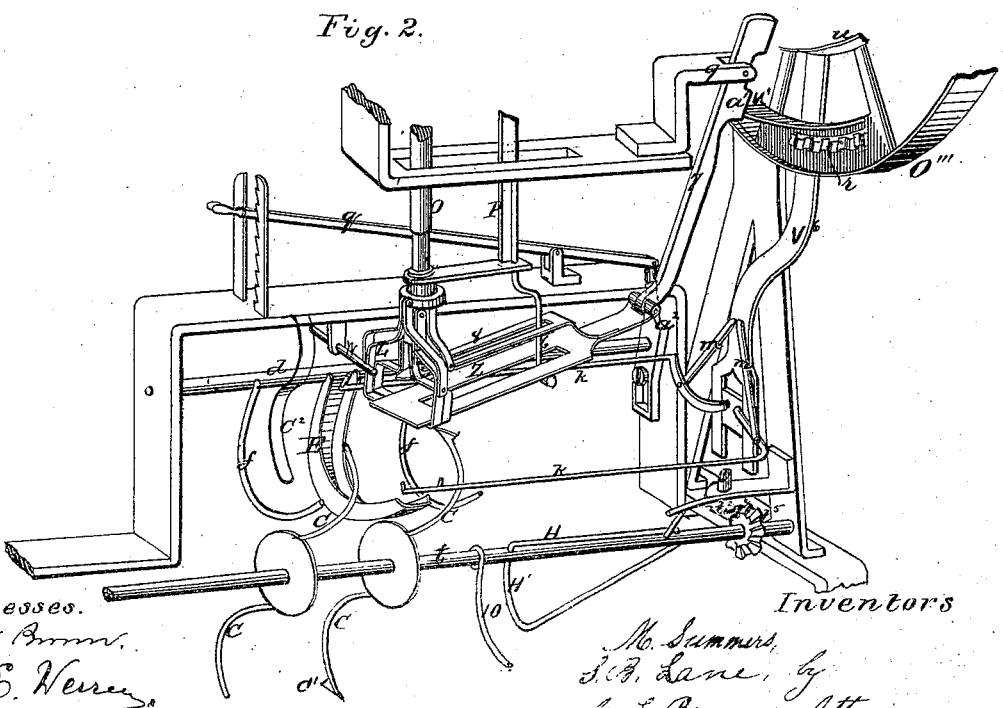
Figure 5:
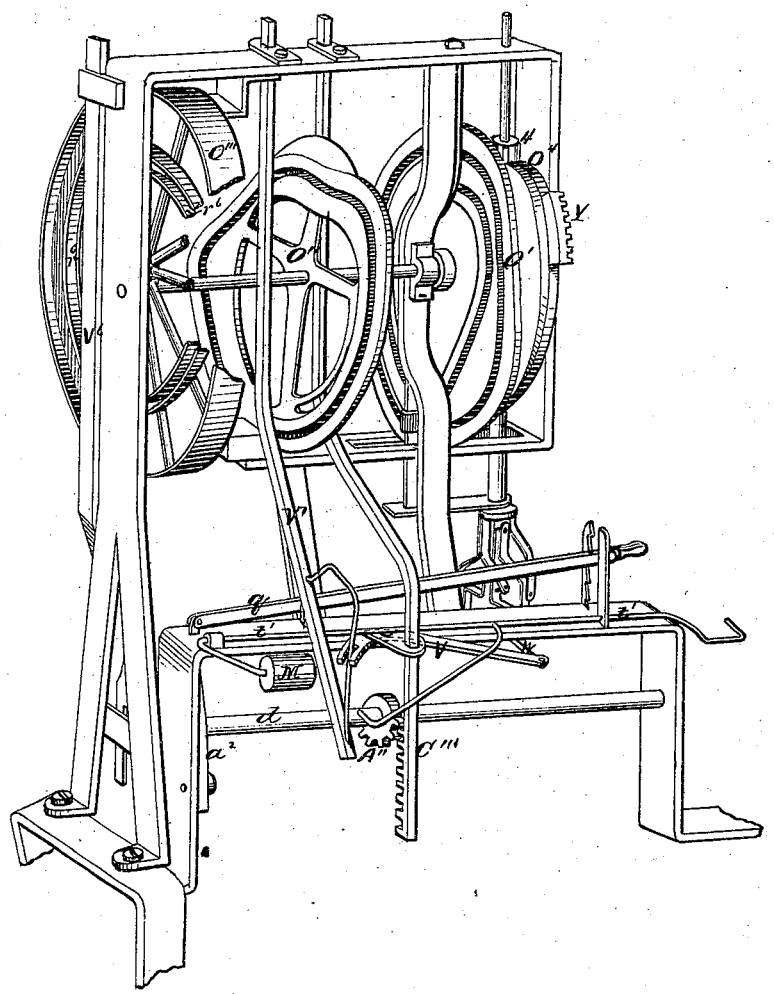

Figure 1 is a front elevation; Fig. 2, a perspective view from the front left corner; Fig. 3, a detached view of the twister when opened; Fig. 4, a detached view of the same when closed; and Fig. 5, a perspective view from the rear left corner.

The construction and arrangement of the several parts of which the binding apparatus is composed will be better understood in describing them in connection with their operation.

1 1 1 is the frame-work, in which all the binding apparatus is mounted and attached to the reaping-machine. The grain is raked or carried from the grain-table as it is cut, and deposited in the receivers 10 10 by means of endless aprons or belts, or other suitable means, operated by the reaping-machine as it is drawn forward. $t$ is a revolving shaft, to which are fixed the curved arms C C and butt-carrier H, by which the grain is taken from the receivers 10 in proper quantity to form a gavel and turned over into the band-holder E and dropper-arms $ff$. The shaft $t$ is rotated by means of the bevel-gears $t^5$ $t^2$, one of which is on the lower end of the vertical shaft $t^3$, on the upper end of which is a pinion, $t^4$, with which a short segment, $r$, on wheel $O'''$ engages once in each revolution, the segment $r$ and pinion $t^4$ being so arranged as to give the shaft $t$ one half revolution, leaving the opposite curved arms C so that while those on one side are in position to receive the grain from the rake the others are holding and compressing the gavel in the band-holder E and dropper-arms $ff$ until the band is brought around the gavel and the ends twisted together and tucked under the band. On account of the position of the arms $k\,k$ that bring the ends of the band together around the gavel, it is impracticable to place another arm, C, to support and carry over the butts of the grain, and hence the necessity for some device for this purpose that will pass under the arms $k\,k$ as the shaft $t$ revolves while it projects below to support the butts. To accomplish this we pass the bent rod H, formed as shown, through the shaft $t$, and connect the ends of it by another rod, H', which also passes through the shaft. This rod is pivoted in the shaft at the angle so that the ends may vibrate freely, so that when the shaft is at rest one arm of the rod hangs down in position to catch the butts while the other arm rests against the shaft so that it can pass freely under the arm $k$. But when it has rotated so as to carry the grain over into the band-holder and dropper it drops by its own gravity into the same position, thereby not interfering with the rotation of the shaft $t$, while subserving the purpose of aiding to carry over the straw. In order to hold the arms C in a proper position, one set of the arms is furnished at the outer ends with catches $C^1$ that engage with a shoulder on a spring, $C^2$, which holds the shaft and arms in the required position until rotated by the cog-bar $r$ as it engages with the pinion $t^4$ on vertical shaft $t^3$. The band-holder and dropper are composed of the curved arms E and $ff$, attached to the shaft $d$. The arm E, forming a part of the dropper, is also the band-holder, being a semi-cylindrical shell curved the same as arms $ff$. The straws for the band are laid longitudinally in the band-holder, at each operation of binding a gavel, by a person seated at A, in convenient reach of the straw that is deposited in the grain-receivers 10 by the endless belts B. When the gavel is deposited in the band-holder and dropper E $ff$ the arms $k$ bring the ends of the straw forming the band together so that the twister L can take hold of them. The arms K are formed as shown, and bent at a right-angle at their outer ends, and are pivoted in the frame 1 1 1. Rods $m$ connect these bent portions of the arms $k$ with a vertical bar, $V^6$, said bar having a vertical reciprocating movement imparted to it by means of the cam-groove $r^6$ on wheel $O'''$, formed to give the rod $V^6$ the proper movement to open and close the arms $m$, as required. At the moment the ends of the bands are brought together the twister takes hold of and twists them. The twister is composed of jaws L, that are pivoted by their upper ends to the lower end of a vertical rod, O, said jaws being opened and closed by the vertical reciprocating movement of the rod, this movement being effected by means of the cam $O^4$ on the periphery of wheel $O^1$ and a flange, $o^2$, on the vertical shaft, said cam being shaped so as to time the movement in accordance with the movement of other parts of the machine. The lower end of rod O is made square and passes through a collar, o, that is hung to revolve in bar 14. Braces S are pivoted by their upper ends in a flange, $a^3$, projecting from the bottom of the collar, and by their lower ends to the jaws L. It is by this arrangement that the vertical movement of the rod opens and closes the jaws. The downward movement of the rod O, carrying the jaws L, is simply the result of its own gravity, which causes the collar $o^2$ to rest on the face of the cam, the latter being shaped to give the upward movement at the proper time to close the jaws upon the ends of the band, and to let the jaws descend at the proper time to bring the ends into position to be tucked under the band by the tucker. As soon as the jaws L have clamped the ends of the band a rotary movement is given to the twister by means of the segment Y that engages with the pinion 4 just above the flange $o^2$. About the time the twist is made in the ends of the band a rod, W, is pushed in forward of the band, over which the twisted ends are bent by a forward movement of the twister, immediately after which the twister descends by its own gravity, so as to turn the ends of the band down over the rod W, and as soon as this is effected the tucker Z moves forward and tucks the ends under the band, thereby securing them. The backward and forward movement of the twister are effected by means of the two cams on the opposite sides of wheels O', the shaft O bearing against the cam on one side, and the vertical bar P, to the bottom end of which the horizontal bar 14 is fixed, in which the lower end of the twister-shaft has its bearing, resting against the cam on the other side. In order to release the hold of the twister on the ends of the band, and at the same time to leave it in such position as to hold them until the tucker is withdrawn, we make one of the jaws L in two parts and attach these parts to the lower end of the shaft O by means of springs L', as shown, so that the parts may be opened laterally by means of the wedge 8, attached to the tucker in such position that as it moves forward the wedge moves with it and opens the bisected jaw laterally, just after the tucker has shoved the ends under the band, thus releasing its hold, while the other jaw remains stationary until the tucker is withdrawn. The tucker is simply a thin bar of iron, pivoted at its forward end to the lower end of lever 7. Said lever having its fulcrum near the upper end in the bracket 9 is moved back to tuck the ends of the band at the proper time by means of a cam, $w'$, on the side of wheel O''', this cam working against the projection $a'$ on the lever below the fulcrum, and the lever 7 is withdrawn and held in position by means of the cam $w$ on the same side of wheel O'''. The rear end of the tucker is supported by a rod, 6, that passes through a long longitudinal slot in it, said rod having an adjustable nut on its lower end, on which the tucker rests. This end of the tucker has to be raised and held up to admit of the twister-jaws opening, and also to allow the arms $k$ that bring together the ends of the band around the gavel to work freely below it, and then let down into proper position at the proper time to tuck the ends of the band. This we accomplish by means of a cam-groove on the side of wheel O', into which projects the upper end of rod 6, bent at a right angle, and furnished with a friction-roller. The dropping device, consisting of the curved arms $f$ and curved band-holder E, attached to the shaft $d$, and which also serves to receive and hold the gavel during the operation of binding, is actuated by means of a rack on the lower end of the bent rod C''', that engages with a segmental cog-wheel, A'', on shaft $d$, said bent rod being moved up and down by means of a pin furnished with a friction-roller that projects from it into a cam-groove on the side of wheel O''. The gavel-holder and dropping device is made adjustable to gavels of various sizes by having its forward end journaled in a vertical sliding bar, $a^2$, which is raised and lowered by means of the lever $q$ at the will of the operator seated at A. The rod W, over which the ends of the band are turned by the forward movement of the twister, is attached to the bent lever V, and said lever is operated to push in and withdraw the rod by means of a cam-groove in the side of wheel O'', into which a pin furnished with a friction-roller projects from the side of vertical rod V', the lower end of which is bent into or has a wire attached to it of the form shown that moves in a slot in the other end of the lever. Motion is imparted to the binder by means of a band connecting the wheel O''' to any suitable part of the driving mechanism of the reaper. This band is made to run loosely, and is tightened to set the binder in motion by means of a tightening-pulley, M, said tightening-pulley being hung on one end of a bent rod, $t^1$, the other end of which is in convenient reach of the operator seated at A. It is by this means that the quantity of grain carried over to the gavel-holder by the curved arms C attached to the revolving shaft $t$ is regulated at will by the operator.

We claim as our invention—

1. The band-holder E, dropper-arms $f$, shaft $d$, pinion A'', rack-bar C''', and wheel O'', combined as specified.

2. The jaws L, tucker Z, bar W, wedge 8, suspension-bar 6, bar 7, and wheel O''', combined as described.

3. The vertical shaft O provided with the pinion 4 and flange $o^2$, the cam-wheel O', the jaws L, braces S, flange $a^3$, bar 14, and rod P, combined as set forth.

4. The jaw L, bisected as shown in Fig. 3, in combination with the springs L', shaft O, and wedge 8, as explained.

5. The butt-holder, consisting essentially of the bent rod H and connecting-bar H' connected with the shaft $t$, as described, so that the butt-holder may vibrate therein, as specified.

6. The arms $k$, rods $m$, bar $V^6$, and wheel $O'''$, combined as described.

MARTIN SUMMERS.
SAMUEL B. LANE.

Witnesses:
ROBERT DODSON,
WM. C. LANE,
JOHN M. SHAW.

(47)